United States Patent
Foehr et al.

(10) Patent No.: US 9,600,792 B2
(45) Date of Patent: Mar. 21, 2017

(54) METHOD AND APPARATUS FOR GENERATING AN ENGINEERING WORKFLOW

(71) Applicant: Siemens Aktiengesellschaft, Munich (DE)

(72) Inventors: Matthias Foehr, Magdeburg (DE); Stefan Horn, Erlangen (DE); Tobias Jager, Erlanger (DE); Mathias Muhlhause, Braunschweig (DE); Heiko Seidel, Braunschweig (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 236 days.

(21) Appl. No.: 13/909,783

(22) Filed: Jun. 4, 2013

(65) Prior Publication Data

US 2014/0310052 A1  Oct. 16, 2014

(30) Foreign Application Priority Data

Apr. 11, 2013  (EP) .................... 13163264

(51) Int. Cl.
*G06Q 10/00* (2012.01)
*G06Q 10/06* (2012.01)

(52) U.S. Cl.
CPC ............... *G06Q 10/06316* (2013.01)

(58) Field of Classification Search
CPC .. G06F 1/00–21/00; G05B 1/00–24/00; G06Q 10/00–50/00
USPC ............................... 705/7.11–7.42
See application file for complete search history.

(56) References Cited

U.S. PATENT DOCUMENTS

| | | | |
|---|---|---|---|
| 5,745,687 A * | 4/1998 | Randell | 709/201 |
| 5,774,661 A * | 6/1998 | Chatterjee et al. | 709/203 |
| 6,230,309 B1 * | 5/2001 | Turner et al. | 717/107 |
| 6,311,144 B1 * | 10/2001 | Abu El Ata | 703/2 |
| 6,370,682 B1 * | 4/2002 | Eckardt et al. | 717/141 |
| 6,473,656 B1 * | 10/2002 | Langels et al. | 700/17 |
| 6,601,233 B1 * | 7/2003 | Underwood | 717/102 |
| 6,618,730 B1 * | 9/2003 | Poulter | G06Q 10/0633 705/7.27 |
| 6,701,325 B2 * | 3/2004 | Becker et al. | |
| 6,959,268 B1 * | 10/2005 | Myers, Jr. et al. | 703/6 |
| 7,165,226 B2 * | 1/2007 | Thurner et al. | 715/767 |
| 7,184,967 B1 * | 2/2007 | Mital et al. | 705/7.26 |

(Continued)

OTHER PUBLICATIONS

Foehr, Matthias, et al. "Integrating mechatronic thinking and multi-agent approaches." Emerging Technologies & Factory Automation (ETFA), 2012 IEEE 17th Conference on. IEEE, 2012.*

(Continued)

*Primary Examiner* — Alan S Miller
(74) *Attorney, Agent, or Firm* — Slayden Grubert Beard PLLC

(57) ABSTRACT

Computer system configured to generate an engineering work-flow, said system comprising a first database which stores a library of engineering patterns and a second database which stores a library of engineering tool functions of an engineering tool, wherein a sequence of automatically concatenated workflow steps forming said engineering workflow is generated by mapping for each workflow step a selected engineering pattern to a selected tool function of said engineering tool.

9 Claims, 4 Drawing Sheets

(56) References Cited

U.S. PATENT DOCUMENTS

| | | | |
|---|---|---|---|
| 7,418,300 B2* | 8/2008 | Gikas et al. | 700/18 |
| 7,428,724 B2* | 9/2008 | Pike et al. | 717/105 |
| 7,464,366 B2* | 12/2008 | Shukla et al. | 717/100 |
| 7,472,341 B2* | 12/2008 | Albornoz | G06Q 10/10 715/229 |
| 7,506,302 B2* | 3/2009 | Bahrami | 717/100 |
| 7,774,167 B2* | 8/2010 | Bregulla et al. | 702/183 |
| 7,805,324 B2* | 9/2010 | Green et al. | 705/7.27 |
| 7,870,432 B2* | 1/2011 | Adler et al. | 717/124 |
| 8,086,664 B2* | 12/2011 | Lo | 709/203 |
| 8,086,666 B2* | 12/2011 | Lo | 709/203 |
| 2002/0072819 A1* | 6/2002 | Becker et al. | 700/95 |
| 2002/0073094 A1* | 6/2002 | Becker et al. | 707/102 |
| 2002/0104068 A1* | 8/2002 | Barrett et al. | 717/104 |
| 2002/0188597 A1* | 12/2002 | Kern et al. | 707/1 |
| 2003/0037090 A1* | 2/2003 | Koh | 709/100 |
| 2003/0061274 A1* | 3/2003 | Lo | 709/203 |
| 2003/0061311 A1* | 3/2003 | Lo | 709/220 |
| 2003/0061349 A1* | 3/2003 | Lo et al. | 709/225 |
| 2004/0039468 A1* | 2/2004 | Zahorack et al. | 700/97 |
| 2004/0044985 A1* | 3/2004 | Kompalli et al. | 717/100 |
| 2004/0078777 A1* | 4/2004 | Bahrami | 717/105 |
| 2005/0055667 A1* | 3/2005 | Beringer et al. | 717/105 |
| 2005/0132064 A1* | 6/2005 | Lo | 709/227 |
| 2006/0005140 A1* | 1/2006 | Crew et al. | 715/760 |
| 2006/0064486 A1* | 3/2006 | Baron et al. | 709/224 |
| 2006/0074736 A1* | 4/2006 | Shukla et al. | 705/8 |
| 2007/0038039 A1* | 2/2007 | Adler et al. | 600/300 |
| 2007/0143736 A1* | 6/2007 | Moriarty et al. | 717/100 |
| 2007/0276714 A1* | 11/2007 | Beringer | 705/7 |
| 2008/0091493 A1* | 4/2008 | Holmstrom | G06F 19/327 705/7.26 |
| 2008/0294493 A1* | 11/2008 | Ohsaki | 705/9 |
| 2009/0276060 A1* | 11/2009 | Lu et al. | 700/21 |
| 2010/0049568 A1* | 2/2010 | Louie et al. | 705/8 |
| 2010/0205225 A1* | 8/2010 | Ahlig | G06Q 10/10 707/803 |
| 2010/0241471 A1* | 9/2010 | Nylander et al. | 705/7 |
| 2011/0153056 A1* | 6/2011 | Bohm et al. | 700/182 |
| 2011/0173043 A1* | 7/2011 | Maier | 705/7.27 |
| 2012/0158165 A1* | 6/2012 | Bohm et al. | 700/97 |
| 2012/0158371 A1* | 6/2012 | Ehben et al. | 703/1 |
| 2012/0203587 A1* | 8/2012 | Bohm et al. | 705/7.12 |
| 2012/0227044 A1* | 9/2012 | Arumugham | G06Q 10/06 718/100 |
| 2013/0117063 A1* | 5/2013 | Kamath | G06F 3/1204 705/7.26 |
| 2013/0254698 A1* | 9/2013 | Schelling et al. | 715/772 |

OTHER PUBLICATIONS

Holm, Timo, Othmar Lehmann, and Stefan Horn. "Reference Model Based Design of Tool Landscapes for Rail Infrastructure Engineering." Annals of DAAAM & Proceedings (2011).*

Luder, A., et al. "Application of engineering processes analysis to evaluate benefits of mechatronic engineering." Emerging Technologies & Factory Automation (ETFA), 2012 IEEE 17th Conference on. IEEE, 2012.*

Lüder, A., et al. "Manufacturing system engineering with mechatronical units." Emerging Technologies and Factory Automation (ETFA), 2010 IEEE Conference on. IEEE, 2010.*

Foehr, Matthias, et al. "Development of a method to analyze the impact of manufacturing systems engineering on product quality." Emerging Technologies & Factory Automation (ETFA), 2011 IEEE 16th Conference on. IEEE, 2011.*

Heinl, Petra, et al. "A comprehensive approach to flexibility in workflow management systems." ACM SIGSOFT Software Engineering Notes. vol. 24. No. 2. ACM, 1999.*

* cited by examiner

METHOD AND APPARATUS FOR GENERATING AN ENGINEERING WORKFLOW

CROSS-REFERENCE TO RELATED APPLICATIONS

This application claims priority to EP Patent Application No. 13163264.8 filed Apr. 11, 2013. The contents of which is incorporated herein by reference in its entirety

TECHNICAL BACKGROUND

Conventional engineering tools offer only a basic support of a workflow by providing tasks, documents or models in a defined sequence. The composition of a workflow is done manually. When customizing, these workflows are programmed by experts into the engineering tool by supplementing the source code of the engineering tool. This naturally leads to customer-specific and product-dependent results. Moreover, the generated workflows can only with difficulty and corresponding expert knowledge be retracked to the original product core.

Accordingly, conventional engineering tools do not provide any systematic support for a user or an expert of the respective application domain of the engineering tool to compose or assemble his own individual workflows from workflow steps and basic functions of the engineering tool.

Accordingly, there is a need for a method and apparatus which offers such a systematic support of a user to generate an engineering workflow for a domain.

SUMMARY

According to a first aspect, the present invention provides a computer system configured to generate an engineering workflow wherein said computer system comprises a first database which stores a library of engineering patterns and a second database which stores a library of engineering tool functions of an engineering tool, wherein a sequence of automatically concatenated workflow steps forming said engineering workflow is generated by mapping for each workflow step a selected engineering pattern to a selected tool function of said engineering tool.

According to a possible embodiment of the computer system according to the first aspect of the present invention, by mapping the selected engineering pattern to the selected tool function the engineering pattern is linked automatically by a linking mechanism provided by said engineering tool to the respective tool function of said engineering tool.

In a possible embodiment of the computer system according to the first aspect of the present invention, said computer system comprises a user interface being provided to map for each workflow step a selected engineering pattern to a selected tool function of said engineering tool.

According to a further possible embodiment of the computer system according to the first aspect of the present invention, the user interface is configured to display a mapping matrix to a user.

According to a further possible embodiment of the computer system according to the first aspect of the present invention, the mapping matrix displayed by said user interface comprises engineering pattern categories each including a set of predetermined engineering patterns stored in the first database and tool function categories each including a set of predetermined tool functions stored in the second database.

In a further possible embodiment of the computer system according to the first aspect of the present invention, the mapping matrix comprises a plurality of input matrix fields for each combination of an engineering pattern and a tool function into which a sequence number of a workflow step within said engineering workflow is input to map the respective engineering pattern to the respective tool function.

In a further possible embodiment of the computer system according to the first aspect of the present invention, each concatenated workflow step of the generated engineering workflow is configured to control a corresponding task of a process.

In a still further possible embodiment of the computer system according to the first aspect of the present invention, the mapping matrix is a configurable matrix loaded from a memory of said computer system.

In a still further possible embodiment of the computer system according to the first aspect of the present invention, the generated workflow including the concatenated workflow steps is displayed by said user interface of said computer system to said user.

In a further possible embodiment of the computer system according to the first aspect of the present invention, for each root object of a domain an associated mapping matrix is provided.

According to a second aspect of the present invention, a method for generating an engineering workflow is provided said method comprising the steps of:
selecting for each workflow step an engineering pattern from a library,
selecting for each workflow step an engineering tool function of an engineering tool from a library, and
generating a sequence of automatically concatenated workflow steps forming said engineering workflow by mapping for each workflow step the engineering pattern selected for the respective workflow step to the tool function of said engineering tool selected for the respective workflow step.

In a possible embodiment of the method according to the second aspect of the present invention, the mapping is performed by means of a mapping matrix displayed to a user via a user interface of a computer system.

According to a further embodiment of the method according to the second aspect of the present invention, the displayed mapping matrix comprises engineering pattern categories each including a set of predetermined engineering patterns stored in a first database of the computer system and tool function categories each including a set of predetermined tool functions stored in a second database of the computer system.

In a further possible embodiment of the method according to the second aspect of the present invention, the displayed mapping matrix comprises a plurality of input matrix fields for each combination of an engineering pattern and a tool function into which a sequence number of a workflow step within said engineering workflow is input to map the respective engineering pattern to the respective tool function.

In a further possible embodiment of the method according to the present invention, each concatenated workflow step of the generated engineering workflow controls a corresponding task of a process.

According to a third aspect of the present invention, an engineering tool is provided comprising an engineering workflow generation function which performs the method according to the second aspect of the present invention.

BRIEF DESCRIPTION OF FIGURES

In the following, possible embodiments of the apparatus and method according to different aspects of the present invention are described in more detail with reference to the enclosed figures.

DETAILED DESCRIPTION

Figure 1:
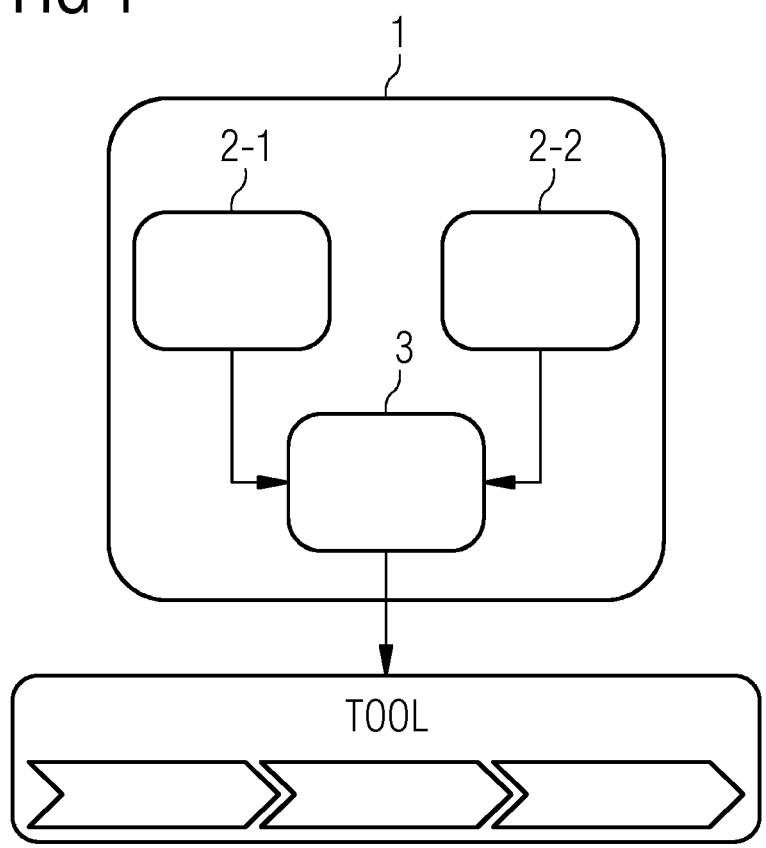
FIG. 1 shows a diagram for illustrating a possible embodiment of a computer system according to the first aspect of the present invention.

A first aspect of the present invention relates to a computer system which is configured to generate an engineering workflow. FIG. 1 shows a diagram for illustrating a possible embodiment of a computer system 1 according to the first aspect of the present invention which is configured to generate an engineering workflow or an engineering tool. The computer system 1 as illustrated in FIG. 1 comprises at least one calculation unit or processor which can have access to databases. As illustrated in FIG. 1, the computer system 1 comprises at least one first database 2-1 which stores a library of engineering patterns and a second database 2-2 which stores a library of engineering tool functions of an engineering tool. The computer system 1 further comprises a user interface 3 as illustrated in FIG. 1. The computer system 1 is configured to generate an engineering workflow wherein a sequence of automatically concatenated workflow steps forming said engineering workflow is generated by mapping for each workflow step a selected engineering pattern to a selected tool function of said engineering tool. By mapping the selected engineering pattern to the selected tool function, the engineering pattern can be linked automatically by a linking mechanism provided within said engineering tool to the respective tool function of said engineering tool.

The first database 2-1 comprises engineering patterns known to the user. These engineering patterns can for example be associated to different categories comprising for instance engineering, engineering coordination, change processes and quality management. By concatenating the single steps, it is possible to generate a corresponding engineering workflow. The other library stored in the second database 2-2 comprises engineering tool functions provided to support the respective working steps. The tool function can also belong to different categories, for instance collaboration, checking, structuring and object definition.

Figure 2:
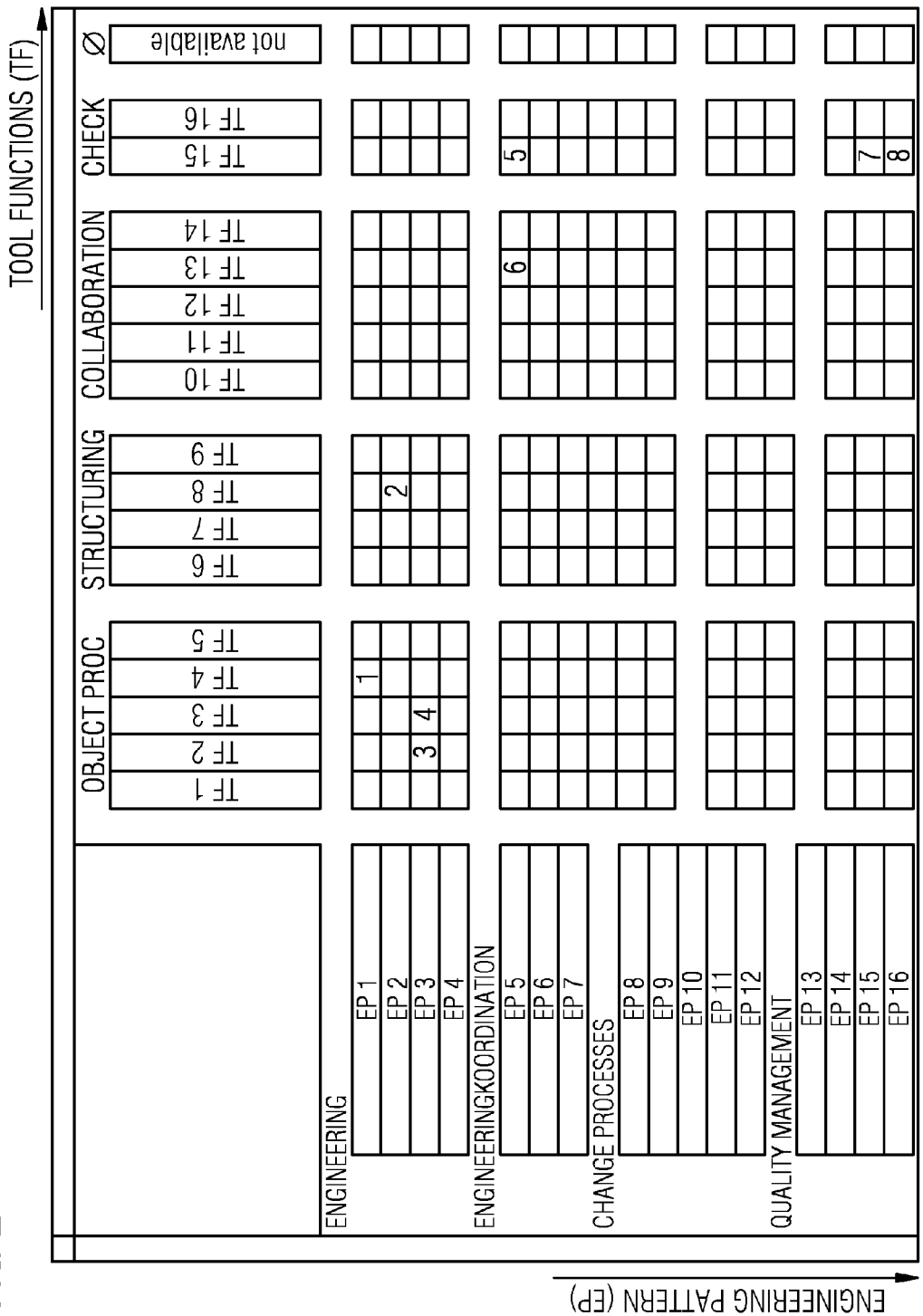
FIG. 2 shows a diagram for illustrating an exemplary implementation of a mapping matrix as used by the apparatus and method according to the present invention.
Figure 4:
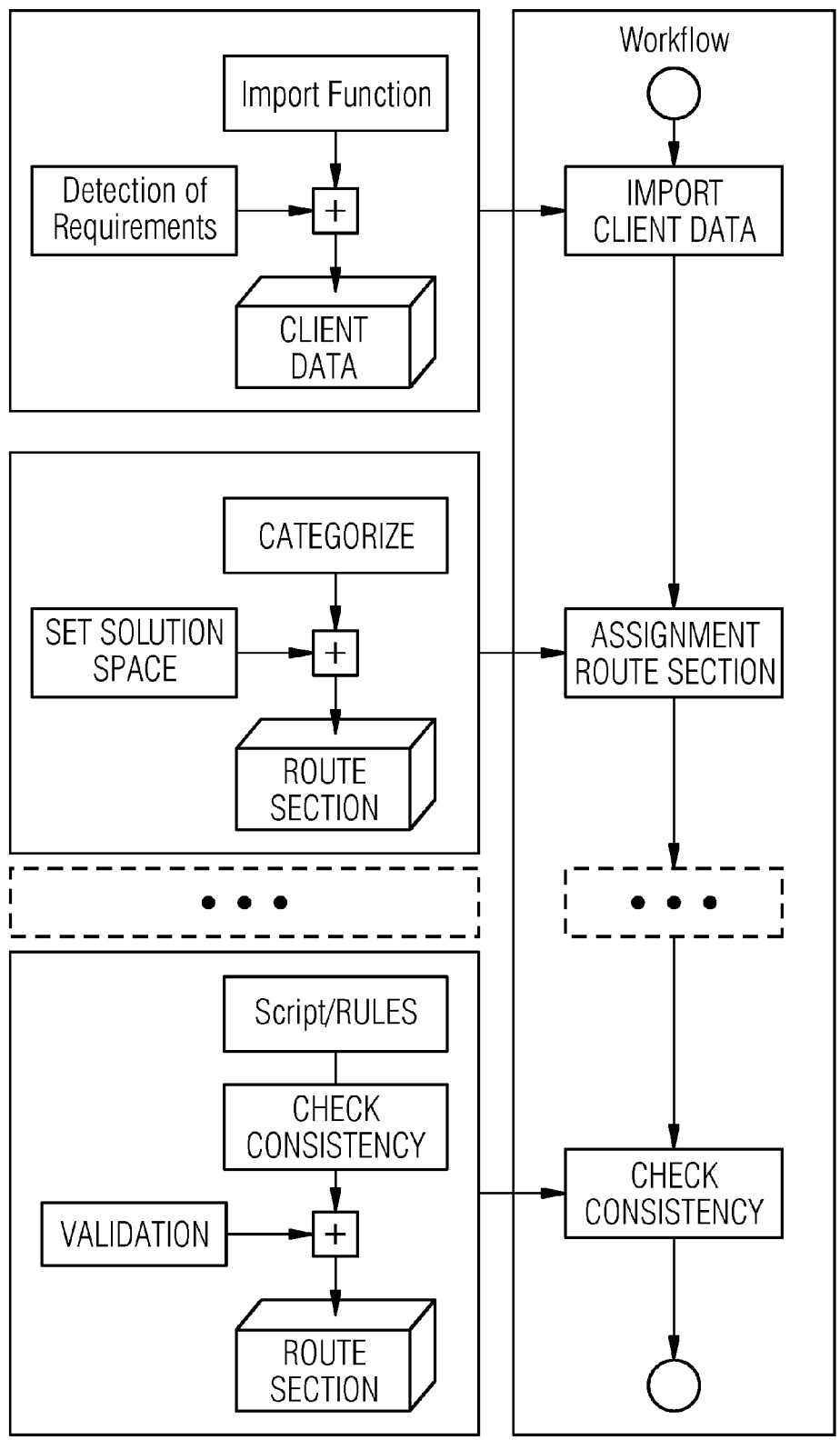
FIG. 4 shows a diagram for illustrating the generation of an engineering workflow using the method and apparatus according to the present invention.

The user interface 3 of the computer system 1 as illustrated in FIG. 1 is provided to map for each workflow step a selected engineering pattern to a selected tool function of said engineering tool. The user interface 3 is configured to display in a possible implementation a mapping matrix to the user. An exemplary implementation of such a mapping matrix is illustrated in FIG. 2. As can be seen in FIG. 2, the mapping matrix displayed by the user interface 3 comprises engineering pattern categories and tool function categories. Each engineering pattern category can include a group or a set of predetermined or configurable engineering patterns stored in the first database 2-1 of the computer system 1. Also, the tool function categories do comprise a set or group of predetermined or configurable tool functions stored in the second database 2-2 of the computer system 1. In the implementation of FIG. 2, the engineering pattern categories are engineering, engineering coordination, change processes and quality safeguarding or quality management. The number of engineering patterns within each pattern category can vary as illustrated in FIG. 2. In the implementation of the mapping matrix shown in FIG. 2, the tool function categories comprise object processing, structuring, collaboration and checking as well as a column indicating that no matching tool function does exist in the respective engineering tool. As can be seen in FIG. 2 in the shown implementation, the mapping matrix is a two-dimensional matrix with n engineering patterns and m tool functions. In a possible embodiment, the mapping matrix as illustrated in FIG. 2 comprises a plurality of input matrix fields for each combination of an engineering pattern and tool function. In the shown embodiment, the mapping matrix comprises n×m input matrix fields. Into each input matrix field a sequence number of a workflow step within said engineering workflow can be input by the user to map automatically the respective engineering pattern selected by the user to the respective tool function selected by the user. In the shown example of FIG. 2 in a first workflow step, the engineering pattern EP1 "detection of requirement" within the category "engineering" is mapped to the tool function TF4 "import" in the category object processing. Further, a second workflow step of the engineering workflow is defined by mapping the selected engineering pattern EP2 "define result space" to the selected tool function TF8 "categorizing" within the workflow function category "structuring" as illustrated in FIG. 2. This is continued until the last workflow step of the engineering workflow has been defined. In the example of FIG. 2, the generated workflow comprises eight workflow steps. In a possible embodiment, each concatenated workflow step of the generated engineering workflow is configured to control a corresponding task of a process. This process can be for instance a technical process within a technical system or environment. The mapping matrix as illustrated in FIG. 2 can be a configurable mapping matrix which is loaded from a memory of the computer system 1. After the engineering workflow including the automatically concatenated workflow steps has been generated, the generated engineering workflow can be displayed by the user interface 3 of the computer system 1 to the user. After visualization of the generated engineering workflow, the user can check whether the generated engineering workflow is correct. FIG. 4 shows an example of a generated engineering workflow generated by using the mapping matrix illustrated in FIG. 2.

Accordingly, for generating the engineering workflow several steps are performed. First, a user can select for each workflow step an engineering pattern from the library stored in the database 2-1. Then, the user can select for each workflow step an engineering tool function of an engineering tool from a corresponding library stored in the database 2-2. In a further step, a sequence of automatically concatenated workflow steps forming said engineering workflow is generated by the computer system 1 by mapping for each workflow step the engineering pattern selected for the respective workflow step by the user to the tool function of said engineering tool selected for the respective workflow step.

With the method and apparatus according to the present invention, the project-or customer-specific customizing of engineering tools is replaced by a system component for automatic composition and generation of engineering workflows. By automatic mapping of basic engineering tool functions on the basis of workflow steps, a consistency between the tool and workflow is guaranteed. Further, an adjustment or customizing of the engineering tool to specific workflows and requirements can be achieved. In contrast to conventional systems, these adjustments or customizations can be retracked to original patterns because the relationships are recorded within the computer system. The specific results for the client and projects are robust against changes of the system, i.e. a migration from one system to the other system is possible.

Computer aided engineering tools facilitate the engineering tasks in that tasks are performed on the basis of workflows. By this, the high complexity of a planning project is shifted from an engineer to the software engineering tool. The workflow can comprise rules which are relevant for the respective technical system and monitors these during the projecting phase so that the occurrence of mistakes or errors is avoided. For the implementation of a workflow, in most cases an adaption of the chosen computer aided engineering tool to the specific requirements of the engineering domain or object is necessary. In a conventional system, the customizing is done by experts which have a specialized knowledge of the corresponding computer aided engineering tool and can be performed by scripts or class libraries. The adjustments are in general in a conventional system very time-consuming and cumbersome.

By providing a computer system and method according to the present invention, a standard function can be provided within the computer aided engineering tool, wherein said standard function forms an engineering workflow generation function of the engineering tool which allows the user to generate an engineering workflow. The generation of the workflow by the user has the advantage that the user has much more detailed knowledge of the respective processes than an expert or specialist of the respective engineering tool. Consequently, the engineering tool can be used without that an adjustment to different engineering domains or objects has to take place.

The engineering patterns are integrated into the engineering tool and can be defined in a general manner so that engineering tasks from different engineering domains, objects or projects and for different project types can be defined and provided. By the combination of the engineering patterns, it is possible to map workflows from the domain of the automation system or power plant projecting or railway automatization in a single engineering tool. Accordingly, the flexibility of the engineering tool is increased because the workflows can be adjusted by the user himself and can be optimized by the user on demand.

The universal engineering patterns can be included in form of a library within the engineering tool. In a possible embodiment, by selecting an engineering pattern, the corresponding tool function within the engineering tool which shall be used for performing the task is assigned to the selected engineering pattern. As a result, an executable model of the engineering workflow is achieved which includes the composition of IT-supported specific engineering tasks.

An example for a use case of the method and apparatus for generating an engineering workflow is explained in more detail. The use case is a provision of a railway switch in an engineering tool as an exemplary scenario of the railway domain for generating a workflow by using engineering patterns. For each activity or root object, a mapping matrix can be provided as illustrated in FIG. 2. By inputting the sequence numbers, the sequence of the workflow steps is defined and at the same time an engineering pattern and an engineering tool function is assigned to the workflow step indicated by the input number.

In the example illustrated in FIG. 2, in a first workflow, step client data is imported into the engineering tool. This data may comprise the position and type of the railway switch desired by the client. In a second workflow step, the working layer is defined in which the railway switch is defined. The working layers can be structured in a hierarchy and represent the route section of the railway system. In a third workflow step, an instance of the railway switch is generated from the general root object "railway switch". To this generated instance attributes are assigned in a fourth workflow step, for instance the type of the railway switch engine. After all attributes have been assigned, the fifth workflow step is automatically started or triggered. In the fifth workflow step, an automatic checking or verification is performed whether all necessary attributes have been projected. Subsequently, the railway switch is inserted into the corresponding working layer of the route section by releasing the preliminary projecting working layer.

After this release, a verification of the building phase is automatically started in a seventh workflow step. In the seventh workflow step, the project rules provided within the engineering tool are checked or verified, for instance a minimal distance of the railway switch to a neighbouring rail. In a last workflow step, a further automatic checking of the route section on the basis of the rules provided by said engineering tool is performed. For instance, rules concerning safety-relevant and/or state-specific railway requirements are checked, for example whether a maximal revolution time of the railway switch has been observed.

As can be seen from the above example concerning a railway switch, it is possible to make use of automatic engineering tool functions, for instance automatic checks or verifications which can be started automatically after the proceeding workflow step has been completed. These checks and/or verifications are started automatically by the generated engineering workflow.

Figure 3:
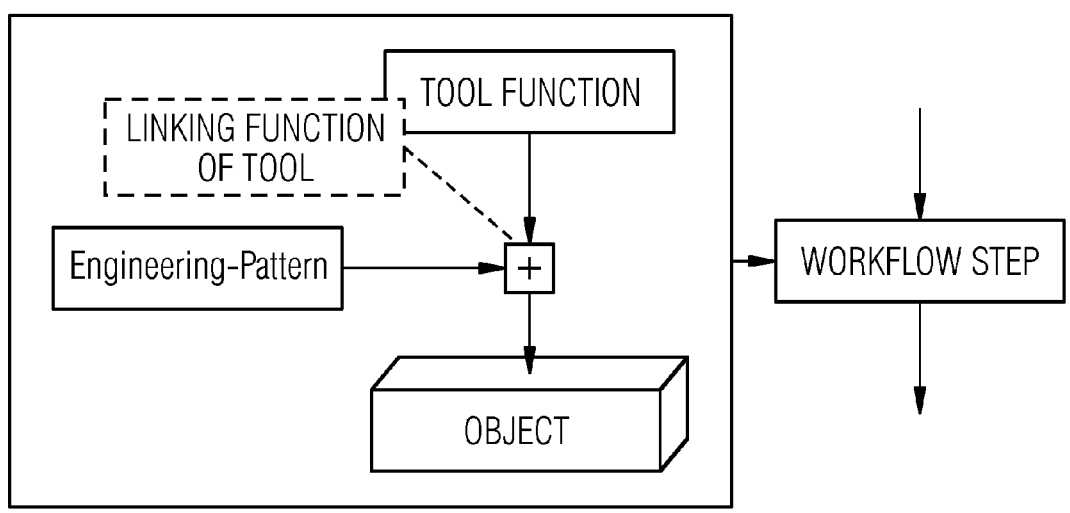
FIG. 3 shows a diagram for illustrating the operation of a method and apparatus according to different aspects of the present invention.

As can be seen in FIG. 3, a link of the engineering pattern with the tool functions leads to an activity which can be applied to an object. In this, a specific workflow step is derived as illustrated on the right-hand side of the figure. The workflow steps are automatically concatenated and result in an engineering workflow. This engineering workflow can be displayed within the engineering tool graphically as illustrated in FIG. 4. FIG. 4 shows the link between engineering patterns and engineering tool functions in detail. From the graphic display of the generated workflow, the user can choose within the engineering tool tasks which he has to work on. Because of the automatic generation of the engineering workflow, the dependencies between the tasks can be recognized easily. Therefore, it is possible that only those tasks are admitted for processing for which already the necessary data is provided. If a task requires for instance data from a preceding workflow step which has not yet been processed or handled, this task cannot be performed by the user.

In a possible embodiment, the configuration for automatic generation of an engineering workflow is performed on the basis of classes. Here, a class, for instance the class "railway switch", also referred to as root object, gets an activity assigned by means of the mapping matrix. For automatic generation of the engineering workflow, the mapping matrix of each root object can be evaluated by a programmed routine. In the engineering tool, the display can be partitioned, wherein in one partition an active workflow and the current task to be performed is shown. Another partition can show the corresponding project surface for performing the respective task. After finalizing a preceding task, the following tasks are automatically displayed and a user can work on performing the respective task.

The engineering workflow generated by the computer system 1 according to the first aspect of the present invention can be stored in a memory which can be accessed by a control unit. This control unit can be configured to control processes or entities within an automation system. The control unit can according to the generated engineering workflow control a process, in particular a physical process within a technical system. The computer system 1 according to the present invention can according to a possible embodiment form part of a workflow management system. For each stage in the generated workflow, an individual user or group of users can be responsible for performing a corresponding specific task. When the task is completed, the workflow management system notifies the individuals or users responsible for the next task specified by the next workflow step within the generated engineering workflow. Further, the workflow management system can provide a user or responsible group of users with data that they need to execute their task assigned to them in the next workflow step of the engineering workflow. The workflow management system comprising the computer system 1 according to the first aspect of the present invention can control automotive processes.

What is claimed is:

1. Computer system configured to generate an engineering workflow and ensure consistency between engineering tools and a workflow utilizing the engineering tools, the computer system comprising:
    at least one processor,
    at least one storage device storing:
        a first database which stores a library of engineering patterns,
        a second database which stores a library of engineering tool functions of an engineering tool, and
    at least one non-transitory computer readable medium storing instructions executable by the at least one processor to:
    generate and display, via a display device, a mapping matrix including:
        (a) a plurality of engineering pattern categories, each including a set of predetermined engineering patterns stored in said first database,
        (b) a plurality of tool function categories, each including a set of predetermined tool functions stored in said second database, and
        (c) an array of matrix intersections between respective engineering pattern categories and respective tool function categories; and
        (d) an input matrix field at each matrix intersection, thereby defining an array of input matrix fields, wherein each input matrix field provides an interface to simultaneously (i) map a selected engineering function to a selected engineering tool function, wherein each mapping between a particular engineering pattern and a particular engineering tool function defines a workflow step, and (ii) specify a respective position of the defined workflow step with respect to a sequence of workflow steps;
    receive via the user interface, a user-specified workflow step sequence order indicator at each of a selected plurality of input matrix fields in the array of input matrix fields of the displayed mapping matrix, wherein the user-specified workflow step sequence order indicator at each selected input matrix field functions both;
        (a) defines a user-defined workflow step based on the respective engineering pattern with the respective engineering tool function, the user-defined workflow step corresponding to a task having one or more persons assigned to that task; and
        (b) defines a user-specified position of the defined workflow step with respect to a sequence of user-defined workflow steps;
    based on the received user input:
        automatically generate an engineering workflow by:
            generating a user-defined workflow step corresponding with each of the plurality of user-selected input matrix fields;
            concatenating the plurality of user-defined workflow steps according to the user-specified workflow step sequence indicators input into each selected input matrix field; and
            storing the engineering workflow in the at least one storage device; and
        display, via the display device, a visual representation of the engineering workflow including:
            (a) a visual representation of each of the plurality of user-defined workflow steps; and
            (b) for each workflow step, a visual representation of a relationship between the respective engineering pattern and engineering tool function that define that workflow step; and
    facilitate execution of the engineering workflow by:
        automatically retrieving the engineering workflow from the at least one storage device; and
        for at least one workflow step, automatically adjusting or customizing an engineering tool corresponding to the respective workflow step to perform the engineering tool function specified by the engineering workflow for the respective workflow step.

2. The computer system according to claim 1, wherein the user-specified workflow step sequence order indicator input at each selected input matrix field is a sequence number of a respective workflow.

3. The computer system according to claim 1, wherein each concatenated workflow step of the generated engineering workflow is configured to control a corresponding task of a process.

4. The computer system according to claim 1, wherein said mapping matrix is a configurable matrix loaded from a memory of said computer system.

5. The computer system according to claim 1, wherein an associated mapping matrix is provided for each of a plurality of root objects of a domain.

6. A method for generating an engineering workflow and ensuring consistency between engineering tools and a workflow utilizing the engineering tools, the method comprising a processor executing computer instructions stored in non-transitory computer-readable media for:
    generating and displaying, via a display device, a mapping matrix including:
        (a) a plurality of engineering pattern categories, each including a set of predetermined engineering patterns stored in said first database, (b) a plurality of tool function categories, each including a set of predetermined tool functions stored in said second database, and (c) an array of matrix intersections between respective engineering pattern categories and respective tool function categories; and (d) an input matrix field at each matrix intersection, thereby defining an array of input matrix fields, wherein each input matrix field provides an interface to simultaneously (i) map a selected engineering function to a selected engineering tool function, wherein each mapping between a particular engineering pattern and a particular engineering tool function defines a workflow step, and (ii) specify a respective position of the defined workflow step with respect to a sequence of workflow steps;

receiving via the user interface, a user-specified workflow step sequence order indicator at each of a selected plurality of input matrix fields in the array of input matrix fields of the displayed mapping matrix, wherein the user-specified workflow step sequence order indicator at each selected input matrix field functions both;

(a) defines a user-defined workflow step based on the respective engineering pattern with the respective engineering tool function, the user-defined workflow step corresponding to a task having one or more persons assigned to that task; and (b) defines a user-specified position of the defined workflow step with respect to a sequence of user-defined workflow steps;

based on the received user input:
  automatically generating an engineering workflow by:
    generating a user-defined workflow step corresponding with each of the plurality of user-selected input matrix fields; and
    concatenating the plurality of user-defined workflow steps according to the user-specified workflow step sequence indicators input into each selected input matrix field;
  storing the engineering workflow in the at least one storage device; and
  displaying, via the display device, a visual representation of the engineering workflow including:
    (a) a visual representation of each of the plurality of user-defined workflow steps; and
    (b) for each workflow step, a visual representation of a relationship between the respective engineering pattern and engineering tool function that define that workflow step; and facilitating execution of the engineering workflow by:
  automatically retrieving the engineering workflow from the at least one storage device; and
  for at least one workflow step, automatically adjusting or customizing an engineering tool corresponding to the respective workflow step to perform the engineering tool function specified by the engineering workflow for the respective workflow step.

7. The method according to claim 6, wherein the user-specified workflow step sequence order indicator input at each selected input matrix field is a sequence number of a respective workflow.

8. The method according to claim 6, wherein each concatenated workflow step of the generated engineering workflow controls a corresponding task of a process.

9. Computer instructions stored in non-transitory computer-readable media and executable by a processor to generate an engineering workflow and ensure consistency between engineering tools and a workflow utilizing the engineering tools by:

generating and displaying, via a display device, a mapping matrix including:
  (a) a plurality of engineering pattern categories, each including a set of predetermined engineering patterns stored in said first database,
  (b) a plurality of tool function categories, each including a set of predetermined tool functions stored in said second database, and
  (c) an array of matrix intersections between respective engineering pattern categories and respective tool function categories; and
  (d) an input matrix field at each matrix intersection, thereby defining an array of input matrix fields, wherein each input matrix field provides an interface to simultaneously (i) map a selected engineering function to a selected engineering tool function, wherein each mapping between a particular engineering pattern and a particular engineering tool function defines a workflow step, and (ii) specify a respective position of the defined workflow step with respect to a sequence of workflow steps;

receiving via the user interface, a user-specified workflow step sequence order indicator at each of a selected plurality of input matrix fields in the array of input matrix fields of the displayed mapping matrix, wherein the user-specified workflow step sequence order indicator at each selected input matrix field functions both;

(a) defines a user-defined workflow step based on the respective engineering pattern with the respective engineering tool function, the user-defined workflow step corresponding to a task having one or more persons assigned to that task; and (b) defines a user-specified position of the defined workflow step with respect to a sequence of user-defined workflow steps;

based on the received user input:
  automatically generating an engineering workflow by:
    generating a user-defined workflow step corresponding with each of the plurality of user-selected input matrix fields; and
    concatenating the plurality of user-defined workflow steps according to the user-specified workflow step sequence indicators input into each selected input matrix field; and
  storing the engineering workflow in the at least one storage device; and facilitating execution of the engineering workflow by:
  automatically retrieving the engineering workflow from the at least one storage device; and
  for at least one workflow step, automatically adjusting or customizing an engineering tool corresponding to the respective workflow step to perform the engineering tool function specified by the engineering workflow for the respective workflow step.

\* \* \* \* \*